US 6,553,138 B2

(12) United States Patent
Rozin

(10) Patent No.: US 6,553,138 B2
(45) Date of Patent: Apr. 22, 2003

(54) METHOD AND APPARATUS FOR GENERATING THREE-DIMENSIONAL REPRESENTATIONS OF OBJECTS

(75) Inventor: Daniel H. Rozin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/223,140

(22) Filed: Dec. 30, 1998

(65) Prior Publication Data

US 2002/0031252 A1 Mar. 14, 2002

(51) Int. Cl.⁷ .............................. G01C 3/00; G06K 9/00
(52) U.S. Cl. ....................................... 382/154; 382/106
(58) Field of Search ................................ 382/106, 108, 382/118, 153, 154, 164, 285, 291, 312, 313; 250/559.23, 559.38; 345/425; 348/50, 142; 356/376; 359/462; 702/152, 153; 901/47

(56) References Cited

U.S. PATENT DOCUMENTS

| | | | |
|---|---|---|---|
| 4,487,472 A | 12/1984 | Asano ........................ 350/3.71 |
| 4,534,650 A | 8/1985 | Clerget et al. .............. 356/376 |
| 4,575,304 A | * 3/1986 | Nakagawa et al. ......... 414/730 |
| 4,628,469 A | * 12/1986 | White ........................ 364/560 |
| 4,705,401 A | 11/1987 | Addleman et al. .......... 356/376 |
| 4,737,032 A | 4/1988 | Addleman et al. .......... 356/376 |
| 4,786,151 A | 11/1988 | Hamada ..................... 350/434 |
| 4,798,210 A | 1/1989 | Ledley .................... 128/660.01 |
| 4,885,594 A | 12/1989 | Eguchi ....................... 346/108 |
| 4,919,502 A | 4/1990 | Yamakawa .................. 350/6.8 |
| 4,957,369 A | 9/1990 | Antonsson .................. 356/376 |
| 4,982,205 A | 1/1991 | Hasegawa ................... 346/108 |
| 5,024,529 A | 6/1991 | Svetkoff et al. ............ 356/376 |
| 5,146,360 A | 9/1992 | Yamakawa .................. 359/216 |
| 5,175,601 A | 12/1992 | Fitts ........................... 356/376 |
| RE34,438 E | 11/1993 | Yamakawa .................. 359/206 |
| 5,363,185 A | 11/1994 | Zana ............................... 356/2 |
| 5,424,836 A | 6/1995 | Weise et al. ................. 356/376 |
| 5,475,422 A | 12/1995 | Mori et al. ..................... 348/48 |
| 5,561,526 A | 10/1996 | Huber et al. ................ 356/376 |
| 5,642,293 A | 6/1997 | Manthey et al. ............ 364/508 |
| 5,654,800 A | 8/1997 | Svetkoff et al. ............ 356/376 |
| 5,668,631 A | 9/1997 | Norita et al. ................ 356/376 |
| 5,671,079 A | 9/1997 | Nagasaka et al. ........... 359/205 |
| 5,675,377 A | 10/1997 | Gibas ........................... 348/47 |
| 5,675,407 A | 10/1997 | Geng ........................... 356/147 |
| 5,710,875 A | 1/1998 | Harashima et al. ......... 345/419 |
| 5,714,762 A | 2/1998 | Li et al. ..................... 250/559.2 |
| 5,807,042 A | * 9/1998 | Almblad et al. ............. 409/83 |

(List continued on next page.)

FOREIGN PATENT DOCUMENTS

| | | | |
|---|---|---|---|
| GB | 2 264 602 A | 1/1993 | .......... G01S/17/46 |
| WO | WO 94/15173 | 7/1994 | .......... G01B/11/24 |
| WO | WO 96/10205 | 4/1996 | .......... G01B/11/00 |

OTHER PUBLICATIONS

Clark, "3D Scanning Systems For Rapid Prototyping", 1997, Assembly Automation, vol. 17, No. 3, pp. 206–210.

(List continued on next page.)

Primary Examiner—Brian Werner

(57) ABSTRACT

The preferred embodiment of the invention includes hardware and software for scanning objects and extracting their geometry and color information so as to generate their 3D (three dimensional) representations in a computer. The preferred embodiment uses a computer, a video camera, a light source, and an indicator located within the field of view of the camera in a fixed position. Preferably, the light source projects a crisp line of light on the scanned object. The software of the preferred embodiment processes the frames produced by the camera. It preferably locates the illuminated line and the indicator, and uses this information to determine 3D coordinates of the illuminated points. The 3D coordinates of the points are used to construct 3D representations of objects. The preferred embodiment also obtains color information of the scanned object and maps it to the 3D representation.

54 Claims, 4 Drawing Sheets

U.S. PATENT DOCUMENTS

| 5,832,139 A | | 11/1998 | Batterman et al. | 382/291 |
|---|---|---|---|---|
| 5,856,844 A | * | 1/1999 | Batterman et al. | 348/207 |
| 5,969,822 A | * | 10/1999 | Fright et al. | 356/376 |
| 6,028,955 A | * | 2/2000 | Cohen et al. | 382/154 |
| 6,108,497 A | * | 8/2000 | Nakayama et al. | 396/429 |
| 6,363,169 B1 | * | 3/2002 | Ritter et al. | 382/154 |

OTHER PUBLICATIONS

Borghese, "Autoscan: A Flexible And Portable 3D Scanner", May/Jun. 1998, Computer Graphics I/O Devices, pp. 38–40.

Petrov et al., "Optical 3D Digitizers: Bringing Life To The Virtual World", May/Jun. 1998, Computer Graphics I/O Devices, pp. 28–36.

Eisenberg, "If The Shoe Fits, Click It", Aug. 13, 1998, New York Times, p. D1.

Li et al., "Mapping Grey–Scale Image To 3D Surface Scanning Data By Ray–Tracing", Feb. 11, 1997, Proceedings, SPIE—The International Society For Optical Engineering, vol. 3023, pp. 26–36.

Lechat et al., "An Approach For Scene Reconstruction From The Analysis Of A Triplet Of Still Images", Feb. 11, 1997, Proceedings, SPIE—The International Society For Optical Engineering, vol. 3023, pp. 169–179.

Burnsides, "Software For Visualization, Analysis, And Manipulation Of Laser Scan Images", Feb. 11, 1997, Proceedings, SPIE—The International Society For Optical Engineering, pp. 159–168.

Proesmans et al., "One–Shot Active 3D Image Capture", 1997, Proceedings, SPIE—The International Society For Optical Engineering, vol. 3023, pp. 50–61.

Demers et al., "Three Dimensional Surface Capture For Body Measurement Using Projected Sinusoidal Patters", Feb. 11, 1997, vol. 3023, pp. 13–25.

Thibault et al., "A Telecentric Scanner For 3D Profilometry Of Very Large Objects", Jun. 16–17, 1997, Proceedings Of Spie Europt Series, vol. 3100, pp. 206–214.

Bhatia et al., "Design Of A Multi–Sensor Optical Surface Scanner", Oct. 31–Nov. 1, 1994, Proceedings, SPIE—The International Society For Optical Engineering, vol. 2355, pp. 262–273.

Soucy et al., "Sensors And Algorithms For The Construction Of Digital 3–D Colour Models Of Real Objects", Sep. 16–19, 1996, Proceedings—International Conference On Image Processing, pp. 409–412.

Power et al., "A Non–Linear Transform Technique For A Camera And Laser 3–D Scanner", May 22–26, 1995, IEEE 1995 National Aerospace And Electronics Conference Naecon 1995, pp. 843–850.

Huang et al. "A Prototype System Of Three–Dimensional Non–Contact Measurement", 1996, The International Journal Of Advanced Manufacturing Technology, 11:336–342.

* cited by examiner

METHOD AND APPARATUS FOR GENERATING THREE-DIMENSIONAL REPRESENTATIONS OF OBJECTS

FIELD OF THE INVENTION

This invention relates to a method and apparatus for scanning objects and generating three dimensional representations of them, preferably using a computer.

BACKGROUND OF THE INVENTION

Three-dimensional ("3D") graphics is an important application of computer technology, but the creation of 3D computer representations of objects is a complicated and time consuming process. Sometimes the best way to create a 3D representation of an object on a computer is to scan in the object using a 3D scanner. This is typically the case when attempting to image people's faces in 3D.

3D scanners exist, but they are typically expensive and complex machines using lasers, optics, motors and sensors, usually employed in commercial environments. Such commercially available 3D scanners are generally outside of the price range of a typical consumer. Yet, given the current proliferation of computer technology, it is desirable to develop a scanner that could enable a wide variety of users, including consumers, to scan objects (including people and other life forms) and generate their 3D computer representations. Thus, there is a need for a scanner which is not prohibitively expensive and at the same time allows for generating 3D computer representations of objects of sufficiently acceptable quality. In this regard, it is also desirable that such a scanner be constructed primarily with off-the-shelf components, which are readily available to consumers and which can also be used for other applications.

A typical 3D scan is a time consuming process. Yet, in practical applications, certain objects do not require high quality 3D representations (and, thus a time consuming process), while other objects should be represented with high quality. Further, it may be desirable to represent certain scanned features of an object with higher resolution than the other features. Thus, it is desirable to develop a 3D computer scanner that is capable of generating 3D representations of varying quality. And, it is also desirable that such a scanner would permit a user to scan different portions of an object with different resolutions, so that the portions of greater interest to the user are scanned with higher resolution.

A user may need to scan objects at locations that are away from home or office. In this regard, it is further desirable that such a scanner would be capable of first recording scanned images on a video medium (e.g., on a tape, video disc, or digital media) and then at a later time processing the stored images to obtain a 3D computer representation of the object depicted on the stored images.

SUMMARY OF THE INVENTION

The system of the preferred embodiment includes hardware and software for scanning objects and extracting their geometry and color information so as to generate 3D representations in a computer. In the preferred embodiment the system uses an off-the-shelf video camera and an ordinary personal computer. Preferably, the camera is mounted on a standard tripod and connected to a light source that projects a crisp line of light on the object from a slight angle with respect to the direction of the camera. In one preferred embodiment, this angle is about 10°, although a different value of the angle can be used as discussed in more detail below. The preferred system also employs an indicator (e.g., a bright light source) located within the field of view of the camera in a fixed position, preferably, in the background of the object. Note that the only hardware component employed by the preferred embodiment which is perhaps not an off-the-shelf component is the light source for projecting a crisp line of light.

The software of the preferred embodiment includes an application running on the computer, which presents a user interface for a user to interact with the software, interprets video frames produced by the camera and creates 3D geometry and color information for the scanned object. The software preferably stores the resultant 3D representation of the scanned object using a commercially standard format, such as VRML1, VRML2, DXF, 3DMF and depth-map. Such formats for storing 3D graphics are known to people skilled in the art. The computational requirements of the software are such that it can be hosted on a standard personal computer such as a PC or Macintosh. For example, in one preferred embodiment the computer is Macintosh with a Power PC 8600, 200 MHZ CPU, internal AV (Audio Video) capability, 64 Meg. of RAM and 4 GB of hard drive. In general, even a computer with lower capabilities may be used for this purpose. A person skilled in the art will be able to match proper hardware to the desired processing requirements.

The preferred system captures color information as well as the geometry of the object by swiping the scanner over an object. The scanner can scan objects of varying size. As noted, the scanner of the preferred embodiment uses a standard video camera that can be supplied by the user. The preferred scanner is hand operated (not motorized) which can reduce cost and allow the user to scan interesting areas in a more detailed manner by moving the camera more slowly and scanning the less interesting parts in less detail by moving the camera faster, so as to create a 3D representation of the object with varying resolution.

Advantageously, the preferred scanner uses the video capture capabilities of a conventional personal computer. It also preferably uses plain light (not laser), which is safer, cheaper and more readily available.

The preferred software uses video data produced by the camera during scanning to evaluate the orientation of the camera. By identifying the location of the indicator which has a specific color, brightness or pattern, the software can evaluate the orientation of the camera in relation to the object. This eliminates the need for sensors which indicate the orientation of the camera during scanning and, therefore, further lowers the complexity and cost of the system. The scanner can be used "off line" without being connected to the computer, and then the resultant video can be transmitted to the computer and processed later.

Thus, the preferred embodiment provides a 3D scanning system that is affordable by many consumers and sufficiently simple to set up and use by such consumers. Yet, it is sufficiently versatile to be employed for commercial applications as well.

BRIEF DESCRIPTION OF THE DRAWINGS

The invention will be better understood when taken in conjunction with the following detailed description and accompanying drawings, in which.

DETAILED DESCRIPTION OF THE PREFERRED EMBODIMENTS

Figure 1:
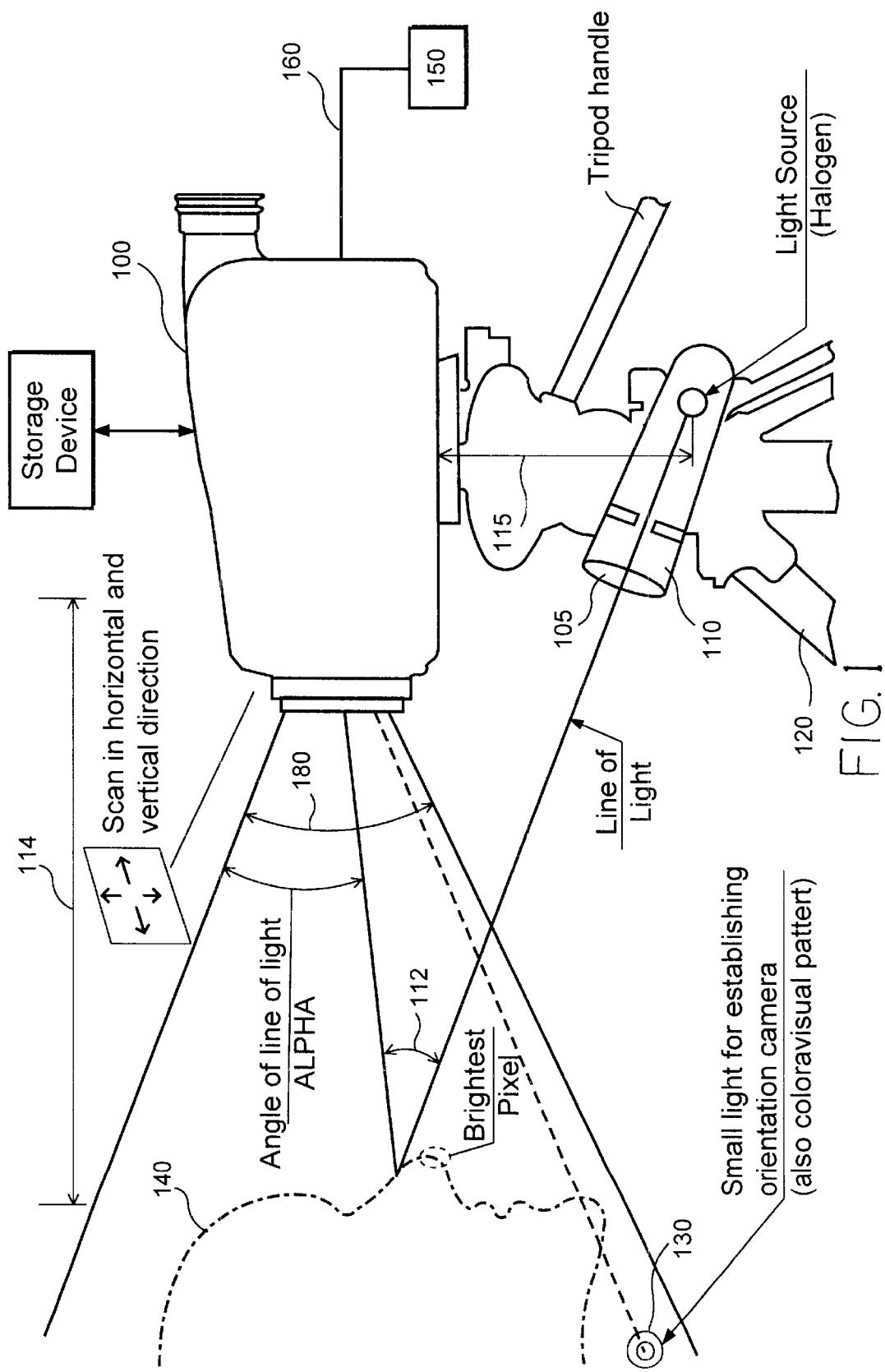
FIG. 1 schematically illustrates the hardware of the preferred embodiment.

The hardware of the preferred embodiment is illustrated in FIG. 1. The hardware includes a scanner device and a computer system. The computer is symbolically shown as 150. It is connected to the camera via interface 160. The rest of the equipment in FIG. 1 belongs to the scanner device (except for the scanned object illustrated at 140).

In general, the scanner device obtains video data representing a scanned object and provides this video data to the computer or stores it on a medium for subsequent transmission to the computer. The video data comprises a set of frames produced by the camera during the process of scanning. The computer uses software to receive and process the video data obtained by the scanner device so as to construct the 3D geometry of the scanned object and assign color information to the object.

The scanner device, illustrated in FIG. 1, includes the following hardware components: camera 100, light source 110, support 120, and indicator 130. In the preferred embodiment, the camera 100, support 120 and indicator 130 are conventional off-the-shelf components that are readily available for purchase by consumers. Preferably, only the light source 110 is specifically made for the scanner. Thus, preferably, the more expensive and complicated parts of the scanner are conventional off-the-shelf parts which can be supplied by the end user and also can be used for other purposes when the scanner is not in use. Of course, in other embodiments, these components can be custom-made for the scanner and, conversely, in some embodiments the light source 100 can be an off-the-shelf component.

The light source 110 preferably produces a crisp line of light. There are various ways to construct such a light source as known in the art. Four preferred ways for constructing such a light source for producing a crisp line of light are based on (1) the light bulb shape, (2) the use of a reflector, (3) the use of a lens, and (4) the use of shutters.

More specifically, the first preferred approach is to use an elongated light bulb, preferably a halogen light, which is sufficiently powerful to produce a line of light. Halogen is a good source for white light rich with IR (infra-red) which makes it well suited for video cameras, which are usually sensitive to IR. In one preferred embodiment, a 150-watt halogen light is used. To produce a horizontal line, this light bulb is mounted horizontally and for a vertical line it is mounted vertically.

The second preferred approach is to use a reflector mounted behind the bulb to condense the light into a narrow strip. The reflector can be constructed from a reflective surface such as polished metal and shaped in a curved manner.

The third preferred technique is to use a lens that can be fitted in front of the light bulb to condense the light into a narrow line. Such a lens should be similar to a projection lens and shaped as a prism. FIG. 1 symbolically illustrates the lens as 105.

In addition, shutters can be used in front of the light bulb and either in front or after the lens to obstruct any light other than a narrow line from reaching the object. Shutters may also be used even if the lens is not employed in constructing the light source.

Any of these techniques or combinations thereof that result in a crisp line of light hitting the object 140 will be sufficient for a scan in accordance with the preferred embodiment. As noted, other techniques may also be used for constructing the light source as known in the art. For example, a laser can be used as a light source.

As noted, the scanner employs the video camera illustrated as 100. Conventional video cameras capable of capturing a sequence of frames can be used as camera 100. For example, well known cameras such as camcorders, Hi 8 cameras, surveillance cameras, digital video cameras, digital computer cameras (Connectix QuickCam) can be used as camera 100. For example, in one preferred embodiment the system uses the Hi 8 Nikon VN/750 camera. Although, preferably, the camera 100 is capable of storing the images on a storage device such as a cassette, tape, disk or diskette, this capability is not required and, in other embodiments, the camera 100 may not have storage capability. If the camera 100 is capable of storing the captured video, the scanner device 100 can first be used autonomously without being connected to a computer. In this case, the computer would process the frames produced during scanning at a later time. If the camera 100 has no video storage capabilities, the frames captured by the camera during scanning must be transmitted to the computer and either stored on the computer or processed in real time.

In order to enable the computer to interpret the video images (also referred to as video data) obtained by the camera 100 as 3D geometry, the scanned object is illuminated by the light source 110 with a narrow crisp line of light which hits the object from a slight angle (illustrated as angle 112) with respect to the direction of the camera. The scanning is preferably done in substantial darkness (but complete darkness is not required). The light source 110 can be incandescent, fluorescent, halogen, laser, infrared or any light source that is visible to the camera in use. The light source 110 may be polarized, but the scanner does not require the use of polarized light. Halogen light is generally preferred. For example, one such preferred embodiment uses a 150 watt halogen incandescent light bulb. As discussed above, to form a crisp line of light, reflectors, lenses and shutters may be used to concentrate the light and block out the unwanted areas.

The line produced by the source 110 may be a vertical or a horizontal line. The direction of the scan is perpendicular to the direction of the line produced by the light source, i.e., the lightsource that produces a vertical line is used for a horizontal scan and a horizontal line is used for a vertical scan. Computer software that processes scanned data can accommodate both directions of scanning (vertical and horizontal). Some objects are scanned better in a specific direction depending on the geometry of a given object. For example, a human face is symmetrical in the horizontal direction but not symmetrical in the vertical direction. Accordingly, a vertical scan is preferred for a face. In a horizontal scan of a face, the nose may obstruct certain areas of the face during scanning.

The light source 110 is preferably connected to the camera in a rigid manner so as to insure that the angle 112 and distance 115 between the camera and the light source remain constant. The angle 112 between the directions of the camera 100 and the light source 110 is preferably adjustable to assure that the area of the scanned object, illuminated by the light source, is within the viewing area of the camera. In one embodiment, when the object 140 is a human face positioned about 4 feet away from the camera (see distance 114), the distance 115 between the light source and the camera is approximately 12" and the angle between the light source and the camera is between 10° and 12°. Depending on the distance between the camera and the object, the angle 112 may need to be adjusted to assure that the line produced by the light source appears on the frames captured by the camera during scanning. The value of the angle 112 is also determined in view of the trade-off between the accuracy of the scan, which is improved with an increased value of the angle 112 and the possibility that some scanned features may become obstructed on the resultant image, which possibility also increases as the angle 112 increases.

The camera 100 and light source 110 are preferably mounted such that they move together. Both camera 100 and light source 110 are preferably supported by the support 120 in a way that allows movement in the pan/tilt directions but restricts the movement in the swivel direction. In other words, the camera 100 and light source 110 are permitted to move up and down or left and right in one plane. As illustrated in FIG. 1, a typical tripod 120 is preferably used for such a support, although other known camera mounts may also be used to provide for support 120 as known in the art. In addition, in some embodiments motorized pan/tilt heads may be used to control remotely the movement of camera 100 and light source 110.

It should be noted that in the preferred embodiment, there are no sensors connected to the camera. To enable the computer to determine the orientation of the camera for a given frame, a known static indicator illustrated as 130 is introduced into the field of view of the camera 100. Thus, when the camera is moved the indicator is depicted in a different area of the frame produced by the camera. As a result, the orientation of the camera can be determined based on the position of the indicator within the frame. The indicator 130 is static and does not move throughout the scanning process.

The indicator 130 is preferably such that it is easily identifiable on the frames generated by the camera to enable the computer to locate the representation of the indicator within the frames. Preferably, the indicator 130 is a bright light which is easy to detect, because the scan takes place in substantial darkness. In addition, a distinctive color or a pattern can be used as indicator 130 as further discussed below. It should be noted that if a bright light indicator is used, its brightness should preferably be higher than the brightness of the line of light generated by the light source 110 to enable the software to distinguish the indicator pixels from the line pixels. If a distinctive color or a pattern is used, the scan should take place in semidarkness. If a large object is to be scanned and not the entire object can be seen at once within the field of view of the camera, more than one indicator may be used. In this case, the indicators should be spaced so that at least one indicator is visible to the camera during scanning.

The computer 150 of the preferred embodiment is an ordinary personal computer with conventional video capabilities that include the capability of receiving video data and storing the received frames. Computer 150 is preferably a personal computer, but can be a workstation, or a larger system such as a minicomputer. One skilled in the art of computer systems will understand that the present invention is not limited to a particular class or model of computer or a particular circuit configuration.

Such a typical computer system includes a central processing unit (CPU), a primary memory, one or more storage devices of secondary memory, e.g., hard disk drives, CD-ROMS, DVDs, input and output devices, and communication interfaces. A system bus is provided for communication between these elements. The communication interfaces may include a modem, a network interface, or other connection to external electronic devices, such as a serial or parallel port. The computer 150 also supports a communication interface with the camera 100. This interface should be compatible with the specific video device employed in a particular system configuration. The link between the computer 150 and the camera 100 is symbolically shown as 160.

The computer hosts software that processes video data provided by the scanner and generates 3D representations of the scanned objects. The computer 150 has a storage capacity, which is at least sufficient to store the geometry and color information of scanned objects in addition to the system's software and the application software discussed here. It also has a display and input devices to present the user with a means of interaction. As noted, a Macintosh personal computer with a 200 MHZ CPU, 64 Meg of RAM, 4 GB hard drive and audio video (AV) capabilities should be sufficient for this purpose.

To capture video frames provided by the camera, the computer 150 is equipped with a video digitizing board if an analog video camera is used, or a parallel/serial communication port if a digital camera is used, or a Firewire communication port if a DV video camera is used. These are off-the-shelf devices known in the art. Other means of receiving video frames from the camera may also be used as known in the art.

The software for processing video data generated by the scanner resides in the computer as known in the art. This software may be used to process "live video" as it is captured in real time by the camera 100, or it may be used to process video data that has been captured by the camera of the scanner and stored on a storage medium, e.g., recorded on a tape or disc.

Figure 2:
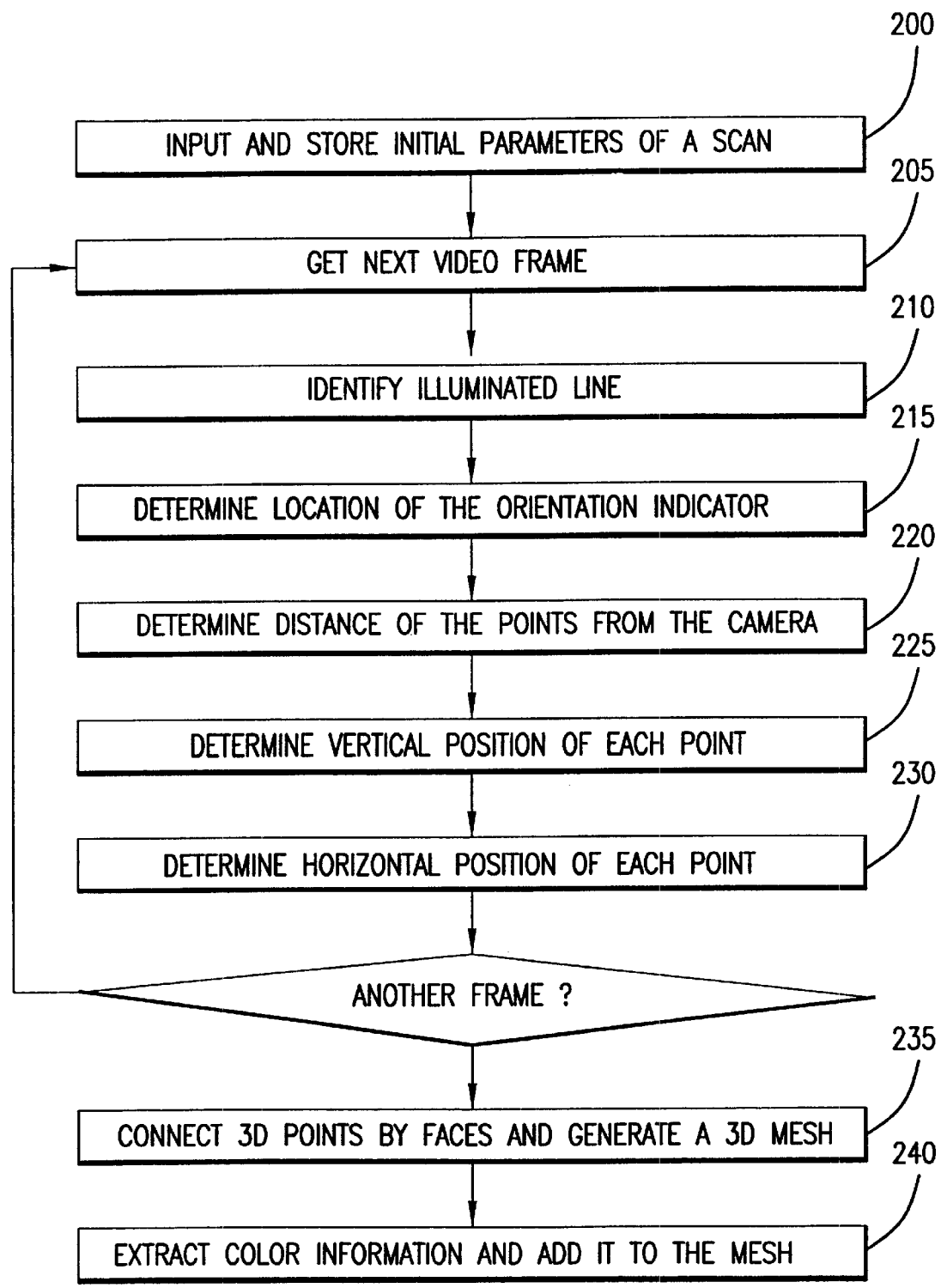
FIGS. 2 and 3 schematically illustrate the computer software of the preferred embodiment.
Figure 3:
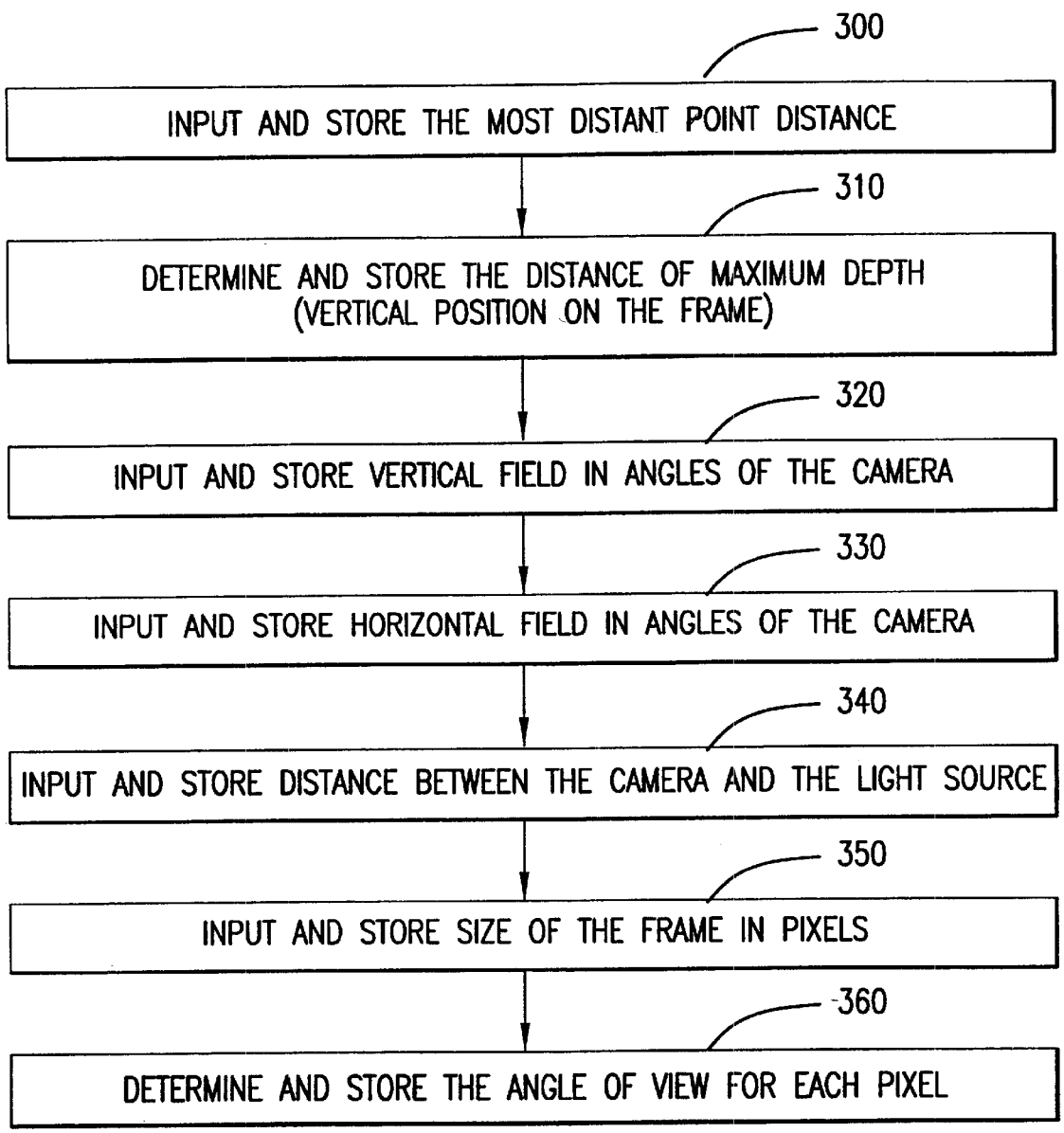

The software application for generating 3D representations functions in accordance with the steps illustrated in FIGS. 2 and 3 and discussed below. It should be noted that the process described herein assumes that the line of light produced by the light source 110 is horizontal (and therefore the scan is vertical). Based on this disclosure, a person skilled in the art will be able to modify the software described herein so as to process images resulting from a horizontal scan employing a vertical line. In this case, the processing described here is rotated by 90 degrees as understood by a person skilled in the art.

First, the software receives a frame of video and converts it into a digital structure that is convenient for processing by software. Generally, a typical video camera produces 30 frames per second. Usually a portion of these frames are processed by the computer 150. The number of the processed frames per unit of time depends on the video processing and other capabilities of a particular computer.

A convenient way to store a frame of scanned video data is to represent it in digital form as an image comprising a pixel map where each pixel is represented by 3 numbers for its RGB values, or by one number if the scanner generates gray scale images. There are various conventional ways of converting video data into such a structure as known to persons skilled in the art. Although these techniques may vary among different computers and operating systems, generally speaking, they are the services provided by the video digitizing hardware and the operating system. A person skilled in the art will know how to integrate them in a particular computing environment. Depending on the storage and processing capabilities of the computer, in one embodiment the computer digitizes and processes frames one at a time as they arrive from the video camera. In another embodiment all the frames are first digitized and stored. Thereafter, they are processed by the computer as discussed below. Regardless of the specific embodiment, each frame is processed in accordance with the principles discussed below.

Initially, a user enters certain parameters specific to a given scan, as indicated in block 200 of FIG. 2 and discussed in further detail below in connection with FIG. 3. Next, the software begins processing the frames one by one (see block 205, FIG. 2).

After a frame of video has been received as shown in 205, software executing on the computer 150 identifies the points on the frame where the line of light illuminated the object. See block 210, FIG. 2. Since a visible non-polarized source of light may be used as light source 110, the line of light on a given frame may have some thickness. This line is usually wider if the object is further away from the camera and the light source. The goal of this process (in block 210) is to identify a line of 1-pixel thick. For this reason, in some embodiments the software identifies the edge of the line of light. Preferably, one of the following three methods are used for identifying the line, although other edge detection methods can be employed as understood by a person skilled in the art. Generally, the methods discussed below are based on going through the pixels vertically from top to bottom, column by column and finding the pixel that is most likely the best representation of the line.

It should be noted that typically, the line is not a straight line but curved due to the 3D nature of the object. Such a line is illustrated as 410 and 420 on FIG. 4.

One method of identifying a pixel on the line involves identifying the brightest point. This method identifies the brightest point in each column and defines it as the point on the line. A user-defined threshold value is used to screen out the points that are most likely not part of the line.

The software goes through the columns pixel by pixel and identifies a pixel in each column with the highest brightness and if the brightness is greater than the predetermined user-defined threshold, the pixels are stored as points of the line. It should also be noted that if a bright light indicator is used, its brightness is typically higher than that of the line of light. In this case, an upper threshold is used so that the "brightest pixel" refers to a pixel brighter than the other pixels in a column, but not as bright as the expected values of the indicator pixels. That is, the pixels with brightness above a certain threshold are simply not considered.

An alternative method identifies the first bright point in each column. Again, a lower and possibly upper (for a bright light indicator) thresholds may be supplied by the user or defined in the system and the software scans the columns pixel by pixel. In each column the first pixel which brightness is higher than the lower threshold (and below the upper threshold) is defined as a point on the line.

A third preferred alternative is based on the greatest difference in brightness. This method finds the brightest pixel in accordance with the first method described above and then it goes back a given number of pixels (this number can be defined by the user). In this process, the software compares each pixel to the one before it. The pixel that has the greatest difference in brightness from the one before it is defined and stored as a point on the line. In other words, the resultant 1-pixel line represents the edge of the upper boundary.

A person skilled in the art may use other methods for extracting a line from an area, as known in the art. Such other techniques include edge detection, erosion, Sobel convolution etc. As noted, a highly illuminated area representing the bright light indicator may also appear on the screen. The relative brightness of the indicator and the brightness of the illuminating line should be adjusted such that it is easy to differentiate them. One approach is to make sure that the indicator is significantly brighter than the illumination light. In this case, as noted, pixels brighter than a given threshold are not considered in determining the pixels of the line.

Next, the software determines the location of the orientation indicator within the image of the currently-processed frame. See block 215, FIG. 2. The method used for this purpose depends on the type of the indicator. The following processes determine the coordinates of one pixel that represents the location of the indicator.

If a bright light indicator is used, the software goes through the image pixel by pixel, identifies the brightest pixel and store its coordinates. In order to achieve a more stable point, the locations of several brightest pixels are identified and then their locations are averaged and stored as the indicator point. The number of such several points can be a user-defined parameter or it can be provided by the system. For example, a user may select a threshold of brightness of the pixels that can be considered for this purpose (or the threshold can be preset in the software). As noted, when the bright light indicator is used, it should be significantly brighter than the brightness of the illuminating line so as not to confuse the pixels belonging to the indicator and those belonging to the line.

If the indicator uses a distinct color, the software examines each pixel of the image and identifies the pixel that has the color which is the closest to the defined color of the indicator. This can be done by applying the following formula to each pixel:

$$\text{DeltaColor} = \text{square root of } ((\text{DefinedColor.Red} - \text{PixelColor.Red})^2 + (\text{DefinedColor.Green} - \text{PixelColor.Green})^2 + (\text{DefinedColor.Blue} - \text{PixelColor.Blue})^2)$$

In this expression the DefinedColor is the color of the indicator and the PixelColor is the color of an examined pixel. After all the pixels have been processed, the pixel with the smallest Delta_Color is selected as the indicator point. To achieve a more stable point, the location of several pixels with the closest DeltaColor values can be identified and then their location can be averaged and stored as the indicator point. The number of such pixels is defined by the user or it can be a default stored in software. For example, the user can indicate the lower threshold value of the DeltaColor. The pixels with the DeltaColor lower than the threshold are then selected.

If a pattern is used to define the indicator point, a representation of the pattern should be pre-stored in the computer. A single consistent point within the pattern is defined as the indicator point. To identify the pattern, the software overlays the pre-stored pattern on all possible locations on the image (height×width of the dimension of the pattern) and determines the location where all the pixels of the image are the most similar to the pattern. The following formula is used for this purpose:

$$\text{DeltaColor} = \text{square root of } ((\text{DefinedColor.Red} - \text{PixelColor.Red})^2 + (\text{DefinedColor.Green} - \text{PixelColor.Green})^2 + (\text{DefinedColor.Blue} - \text{PixelColor.Blue})^2)$$

The sum of all values of DeltaColor of the pattern pixels is used as a measure of the total similarity of the current location to the pattern. The location in which this sum is the smallest is used to determine the indicator point which can be any consistently selected point within the pattern, e.g., its center or one of the corners.

It should be noted that if a color or a pattern is used as an indicator, scanning cannot take place in total darkness. The object should be illuminated such that the color or pattern are distinguishable on the frames, but at the same time the bright illuminated line is also identifiable.

In order for the software to be able to interpret the video supplied by the camera as 3D geometry, several measurements must be supplied by the user to calibrate the system. The input and storage of this data is identified as 200 in FIG. 2 and illustrated in further detail on FIG. 3.

The first entered measurement is denoted as MaximumDistance. This is the most distant point of the object that is being scanned. (See block 300, FIG. 3). The user has to measure this distance and input it into the computer. A wall behind the object is usually the best point of reference.

Figure 4:
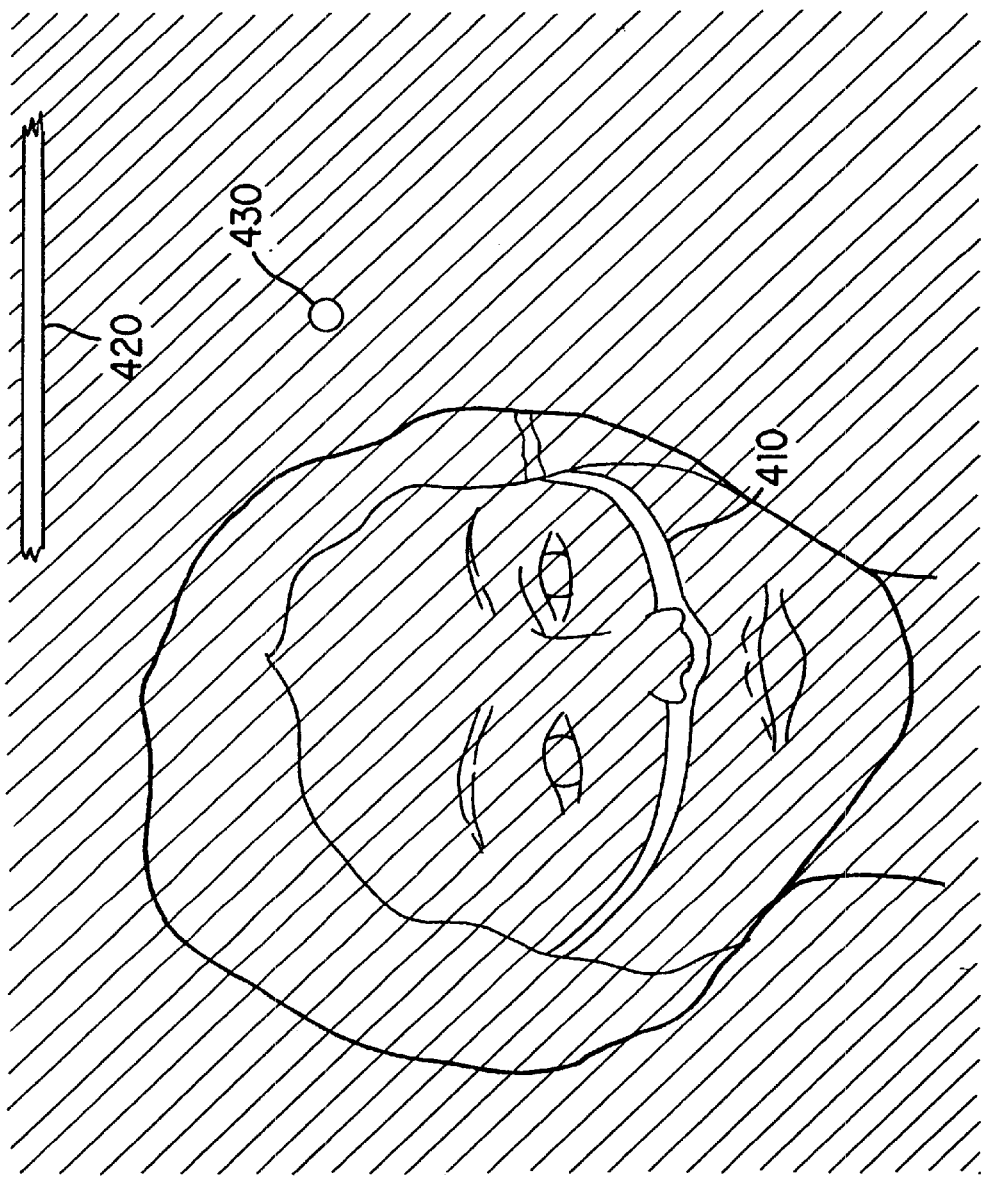
FIG. 4 illustrates a frame of the scanned output.

Another entered measurement is denoted as VerticalPositionOfMaximumDistance. See block 310. The user must move the camera to a position where the line of light is hitting the point of MaximumDistance and measure the vertical position of this point within the video image. This can be done by letting the camera point at the background. FIG. 4 illustrates the bright line as 410 and 420 and the indicator as 430. The portion of the bright line indicated as 410 illuminates the object and another portion 420, shows the line pointing at the background wall which is at the maximum, which indicates the distance of the maximum depth. The vertical location of 420 with respect to the coordinate system of the frame is measured and stored indicating the vertical position of this distance of maximum depth.

Next, the parameter denoted as CameraVerticalFieldAngle is determined and entered. See block 320. FIG. 3. This parameter defines the vertical field in angles of the camera, in the specific magnification. See 180, FIG. 1. In other words, it identifies the degree of zoom that the camera is using in the vertical direction. This value can be determined as a ratio between a vertical view of the camera on the background wall and the distance from the camera to the background wall.

Next, the CameraHorizontalFieldAngle is determined and stored. This parameter specifies the horizontal field in angles of the camera, in the specific magnification. See block 330, FIG. 3. That is, this parameter determines the degree of zoom in the horizontal direction. (It should be noted that in typical commercially available cameras this value is ⁴⁄₃ of the CameraVerticalFieldAngle).

Also, the parameter CameraToLightDistance, which denotes the vertical distance between the camera and the light source when the camera is leveled, is entered and stored. See block 340.

Finally, two parameters FrameWidth and FrameHeight are entered and stored. See block 350. These numbers define the size of the frame produced by the camera in pixels. A typical frame is 640×480 pixels, but other dimensions (or resolutions) can also be used.

From this information a value denoted as PixelAngle, which is the angle of view that the pixels in the image represent, is computed. See block 360, FIG. 3. This value indicates the angle of the camera represented by the pixels of a frame. It can be computed as follows assuming that the pixels are square:

pixelangle=CameraVerticalFieldAngle/FrameHeight.

After the bright line and the indicator have been identified and stored, this data is processed to determine 3D geometry represented by the frame. At 220 (FIG. 2), the distance of each point of the identified line from the camera (i.e., dimension Z) is computed. The computer has stored a group of points (VerticalPosition×HorizontalPosition) which are the points of the line that have been identified on the (frame. Also, the coordinates of the point which represents the indicator point (IndicatorHorizontal×IndicatorVertical) has been stored. In addition, the values discussed above have been stored.

Based on this information, the computer determines the distance from the camera for the stored points on the identified line using the following steps:

alpha=PixelAngle*(VerticalPosition−VerticalPositionOfMaximumDistance))

beta=atan(CameraToLightDistance/MaximumDistance)

delta=180*0.01745−(beta+alpha)

depth=(sin(beta)/sin(delta))*MaximumDistance.

At the end of this computation, the distance of each point on the identified line from the camera has been computed as "depth".

Next, as illustrated in block 225, a vertical position (Y) of each point on the identified line is computed using the following computational steps:

alpha=PixelAngle*(VerticalPosition−VerticalPositionOfMaximumDistance))

PointVerticalAngle=alpha−(IndicatorVertical*PixelAngle)

Height=sin(PointVerticalAngle)*depth

For each point, the vertical position of the point is the value of Height.

Next, the horizontal position (X) is computed for all the points identified on the line using the following steps:

PointHorizontalAngle=(HorizontalPosition−IndicatorHorizontal)*PixelAngle

Width=depth *sin(PointHorizontalAngle)

For each point, the horizontal position of the point is Width. See block 230.

After all three dimensions of each point have been computed for all the points identified for the bright line in a given frame, these 3D locations of the points are stored and a new frame is processed as discussed above. This process is repeated while the user is moving the camera across the object until the user decides that enough information has been gathered. The same processing is performed if the scanned images had been stored and then transferred to a computer at a later time.

As apparent to a person skilled in the art, it is possible to determine 3D coordinates of the points because the stationary indicator provides sufficient information to ascertain the location of the camera. It should be noted, however, that in the above computations, the camera orientation is not computed explicitly. Instead, the computations take into account the location of the indicator (IndicatorVertical, IndicatorHorizontal) and therefore compensate for any change in the camera orientation. Thus, the 3D coordinates are determined based on the camera orientation, which in turn is determined by the location of the indicator, even though the camera orientation is not computed as a separate variable.

At the end of the process, 3D points collected from the frames have been stored on the computer. These points are then combined into an object by connecting every three points, which are the closest to each other, by a face, and creating a mesh representing the scanned object. See block 235, FIG. 2. The resultant geometry is saved using an appropriate file format. Such file formats may include DXF, VRML, 3DMF, and DepthMap as known in the art.

Finally, color information is added to the 3D mesh. For this purpose, the user generates a frame for use as a color map. For best results the scanner light source should be turned off and the entire object should be illuminated. Then, the user can point the camera at the object and obtain a frame of the video and store it digitally as an image. Many file formats can be employed for this purpose, some of which are GIF, JPEG, BMP, PICT or any other image formats known in the art. The image can then be attached to the geometry, generated as discussed above, and be displayed as an integral part of it adding a realistic look to the model. A large number of software packages exist that accept the geometry and image, and then combine and display them. These programs include SoftImage, InfiniD, 3D Studio Max, StrataStudio and a large collection of VRML viewers.

In the process discussed above, the resolution of the 3D representation is increased when the camera is moving slowly, thereby generating more frames with lines of light more closely spaced. Consequently, more points that are used for building a 3D shape are generated. On the other hand, if the camera is moved faster, the lines on the frames are further apart so that fewer points are generated. Accordingly, when the camera is moving faster, the resolution decreases.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, which scope is defined by the following claims.

What is claimed is:

1. An apparatus for generating a 3D computer representation of an object comprising:
   (a) a camera;
   (b) a light source for illuminating at least a portion of the object;
   (c) a support for the video camera and the light source, wherein the support permits moving the camera and the light source so as to scan the object;
   (d) a stationary position indicator within a field of view of the camera; and
   (e) a computer with video capture capability for receiving video information captured by the camera, including images each of which comprising pixels representing an illuminated portion of the object and the position indicator,
      wherein the computer obtains calibration parameters during a calibration procedure, without regard to the indicator, based on a special relationship between the camera, the light source and the object, and
      wherein, after a completion of the calibration procedure, the computer receives and evaluates the video information associated with the object in real time so as to generate the 3D representation of the object based on a position of the indicator, the images and the calibration parameters.

2. The apparatus of claim 1 wherein the light source provides a crisp line illuminating the object.

3. The apparatus of claim 1 wherein the light source illuminates the object at a substantially small angle with respect to the direction of the camera.

4. The apparatus of claim 1 wherein the support is such that a user can move the camera and the source and wherein when a user moves the camera and the source more slowly, the 3D representation is more detailed and when the user moves the camera and the source faster, the 3D representation is less detailed.

5. The apparatus of claim 1 wherein the computer processes video information provided by the camera in real time as a user scans the object using the camera.

6. The apparatus of claim 1 wherein the video information is recorded on a storage medium during scanning and then provided to the computer at a later time for generating the 3D representation.

7. The apparatus of claim 1 wherein the indicator is positioned in the background of the object.

8. The apparatus of claim 1 wherein the indicator is a bright light.

9. The apparatus of claim 1 wherein the indicator is a visual two-dimensional pattern.

10. The apparatus of claim 1 wherein the indicator is a color which is used to provide at least one of the orientation and the position.

11. The apparatus of claim 1 wherein the support is a tripod.

12. The apparatus of claim 1 wherein the light employed by the light source is a halogen light.

13. The apparatus of claim 1 wherein the light source generates a vertical line of light and the object is scanned by the camera in a horizontal direction.

14. The apparatus of claim 1 wherein the light source generates a horizontal line of light and the object is scanned in the vertical direction.

15. The apparatus of claim 1 wherein the support is configured to enable a user to move the camera and the light source by hand.

16. A method of obtaining a 3D computer representation of an object, comprising:
   a. storing, in a computer memory, images of a sequence of video frames obtained by scanning, each of which includes a depiction of a portion of the object illuminated by a line of light and a depiction of a statically-mounted orientation indicator;
   b. determining locations of the orientation indicator within the frames;
   c. performing a calibration procedure, without regard to the indicator, to obtain calibration parameters based on a spacial relationship between the camera, the light source and the object;
   d. after a completion of step c, determining 3D locations of at least some points on the portion of the object in real time based on pixels representing the individual lines of light in the sequence of frames obtained by scanning; and
   e. after step c and during step d, generating the 3D computer representation of the object using a position of the indicator, the calibration parameters and the 3D locations.

17. The method of claim 16 wherein the step of
   determining 3D locations of the points comprise determining a distance of a point, represented by a pixel on the image from a camera; determining a horizontal position of the point represented by the pixel; determining a vertical position of the point represented by the pixel.

18. The method of claim 16 further comprises locating pixels depicting the illuminated portion of the object by identifying the brightest pixel among the pixels of at least a portion of the image.

19. The method of claim 16 further comprising locating pixels depicting the illuminated portion of the object by identifying the first bright pixel among the pixels of at least a portion of the image.

20. The method of claim 16 further comprises locating pixels depicted on the illuminated portion of the object by determining the greatest change in brightness between the pixels within at least a portion of the image.

21. The method of claim 16 wherein the step of determining the location of the orientation indicator comprises identifying the indicator by pixel brightness.

22. The method of claim 16 wherein the step of determining the location of the orientation indicator comprises identifying the indicator by pixel color.

23. The method of claim 16 wherein the step of determining the location of the orientation indicator comprises identifying the indicator by a pattern of pixels.

24. The method of claim 16 further includes the step of creating a color map.

25. An apparatus for scanning an object and generating a three-dimensional representation of at least a portion of the object, comprising:
 (a) a camera adapted to receive video information, and generate images of at least a portion of the object associated with the video information when the portion of the object is in a field of view of the camera;
 (b) a light source adapted to illuminate at least a portion of the object within the field of view of the camera within a line of light;
 (c) a stationary indicator positioned within the field of view of the camera, and
 (d) a processing arrangement adapted to obtain calibration parameters during a calibration procedure, the processing arrangement generating the three-dimensional representation using the calibration parameters,
  wherein each of the images comprises a depiction of the stationary indicator and a depiction of particular points of a portion of the object illuminated by the line of light,
  wherein the calibration parameters are obtained based on a spacial relationship between the camera, the light source and the object and without regard to the indicator, and
  wherein, after a completion of the calibration procedure, the processing arrangement is adapted receive data associated with the object in real time so as to construct the three-dimensional representation of at least a portion of the object using a position of the indicator, the calibration parameters and a sequence of such images with the particular points of different portions of the object illuminated by the line of light.

26. The apparatus of claim 25 wherein the stationary indicator is a bright source of light.

27. The apparatus of claim 25 wherein the stationary indicator is a distinctive color which is used to provide at least one of the orientation and the position.

28. The apparatus of claim 25 wherein the stationary indicator is a predetermined two-dimensional pattern.

29. The apparatus of claim 25 wherein the camera is a conventional video camera that can be purchased by an ordinary consumer.

30. The apparatus of claim 25 wherein the camera is a camcorder.

31. The apparatus of claim 25 wherein the camera is a Hi 8 camera.

32. The apparatus of claim 25 wherein the camera is a digital camera.

33. The apparatus of claim 25 wherein the line of light is vertical.

34. The apparatus of claim 25 wherein the line of light is horizontal.

35. The apparatus of claim 25 wherein the light source emits halogen light.

36. The apparatus of claim 25 wherein the light source emits incandescent light.

37. The apparatus of claim 25 wherein the illumination provided by the light source is in a direction which is at an angle with respect to a direction of the camera.

38. The apparatus of claim 37 wherein the angle is substantially small.

39. The apparatus of claim 25 further comprising a support for supporting both the camera and the light source.

40. The apparatus of claim 25 wherein the scanning includes moving the camera and the light source in a vertical direction while the light source illuminates the object with a line of light oriented in a horizontal direction.

41. The apparatus of claim 25 wherein the scanning includes moving the camera and the light source in a horizontal direction while the light source illuminates the object with a line of light in a vertical direction.

42. A computer method for processing a sequence of images, the images including a depiction of a stationary indicator and a depiction of a portion of an object illuminated by a line of light, the computer method comprising:
 receiving video information associated with at least one portion of the object;
 identifying a location of the stationary indicator in each of the images in the sequence, wherein the images corresponds to the received video information;
 performing a calibration procedure to obtain calibration parameters based on a spacial relationship between the camera, the light source and the object and without regard to the indicator;
 in real time, identifying a portion of the object illuminated by the line of light in each of the images in the sequence; and
 after a completion of the calibration procedure, determining 3D coordinates of at least some points located on the object so as to generate a 3D representation of the at least one portion of the object using a position of the indicator, the calibration parameters, and the identified locations of a portion of the line of light in the images.

43. The method of claim 42 wherein the step of identifying the location of the indicator includes searching the image for one or more pixels of high brightness.

44. The method of claim 42 wherein the step of identifying the location of the indicator includes searching the image for one or more pixels having substantially a predetermined color.

45. The method of claim 42 wherein the step of identifying the location of the indicator includes searching the image for a group of pixels substantially corresponding to a pattern.

46. The method of claim 42 wherein the illuminated portion of the object depicted on the image comprises an illuminated line on a substantially dark background.

47. The method of claim 46 further comprising identifying pixels located on the line.

48. The method of claim 47 wherein the step of identifying the pixels on the line comprises locating in a plurality of pixels the brightest pixel, which is not one of the pixels representing the indicator.

49. The method of claim 47 wherein the step of identifying the pixels on the line comprises locating in a plurality of pixels a first bright pixel, which is not a pixel representing the indicator.

50. The method of claim 47 wherein the step of identifying the pixels comprises locating in a plurality of pixels a pixel, not representing the indicator and having the greatest change in brightness with respect to other pixels of the plurality of pixels.

51. The method of claim 46 wherein the step of determining 3D coordinates comprises determining the distance from the camera of the points on the object corresponding to the pixels of the illuminated line depicted on the image.

52. An article of manufacture for processing a sequence of images, the images including a depiction of at least one portion of an object illuminate by a line of light and a depiction of a stationary indicator, the article of manufacture comprising:

software for identifying locations of such stationary indicator in the images of the sequence, wherein the images are associated with video information received for the at least one portion of the object;

software for identifying, in real time, illuminated portions of the object in the images of the sequence;

software for performing a calibration procedure to obtain calibration parameters based on a spacial relationship between the camera, the light source and the object and without regard to the indicator; and software for determining 3D coordinates of at least some points located on the object using a position of the indicator, the calibration parameters and the illuminated portion of the object so as to generate a 3D representation of the at least one portion of the object, wherein the 3D coordinates are determined after a completion of the calibration procedure.

53. The article of claim 52 wherein the illuminated portion of the object depicted on the image comprises an illuminated line on a substantially dark background.

54. The article of claim 53 further comprising software for identifying pixels located on the line.

* * * * *

UNITED STATES PATENT AND TRADEMARK OFFICE
CERTIFICATE OF CORRECTION

PATENT NO.     : 6,553,138 B2
DATED          : April 22, 2003
INVENTOR(S)    : Rozin, Daniel H.

It is certified that error appears in the above-identified patent and that said Letters Patent is hereby corrected as shown below:

<u>Title page,</u>
Item [56], References Cited, OTHER PUBLICATIONS, under "Thibault et al.," "Spie Europt" should read -- SPIE Europe --; and
Under "Power et al.," "Naecon" should read -- NAECON --
Item [57], ABSTRACT,
Line 4, "three dimensional" should read -- three-dimensional --

<u>Drawings,</u>
Figure 1, "orientation camera" should read -- orientation of camera --; "coloravisual" should read -- color and visual --; and "pattert" should read -- pattern --

<u>Column 1,</u>
Line 8, "three dimensional" should read -- three-dimensional --

<u>Column 2,</u>
Line 21, "MHZ" should read -- MHz --

<u>Column 4,</u>
Line 44, "lightsource" should read -- light source --

<u>Column 6,</u>
Line 16, "MHZ" should read -- MHz --

<u>Column 7,</u>
Line 36, "¶The" should read -- The -- (append to previous line)
Line 39, "of" should read -- on --

<u>Column 8,</u>
Line 11, "currently-processed" should read -- currently processed --
Line 42, "Delta_Color" should read -- DeltaColor --

<u>Column 10,</u>
Formula at line 14, "Distance))" should read -- Distance) --
Formula at line 16, "atan" should read -- tan --
Formula at line 28, "Distance))" should read -- Distance) --

UNITED STATES PATENT AND TRADEMARK OFFICE
CERTIFICATE OF CORRECTION

PATENT NO. : 6,553,138 B2
DATED : April 22, 2003
INVENTOR(S) : Rozin, Daniel H.

It is certified that error appears in the above-identified patent and that said Letters Patent is hereby corrected as shown below:

Column 11,
Line 53, "which comprising" should read -- which comprises --
Line 58, "special" should read -- spatial --

Column 12,
Line 43, "statically-" should read -- statically --
Line 49, "spacial" should read -- spatial --
Line 60, "comprise" should read -- comprises --
Line 65, "pixel;" should read -- pixel; and --

Column 13,
Lines 1 and 8, "comprises" should read -- comprising --
Line 21, "includes" should read -- including --
Line 44, "spacial" should read -- spatial --
Line 48, "adapted" should read -- adapted to --

Column 14,
Lines 34-35, "corresponds" should read -- correspond --
Line 37, "spacial" should read -- spatial --

Column 15,
Line 18, "illuminate" should read -- illuminated --

Column 16,
Line 6, "spacial" should read -- spatial --

Signed and Sealed this

Seventh Day of October, 2003

JAMES E. ROGAN
*Director of the United States Patent and Trademark Office*